(12) United States Patent
Zierdt et al.

(10) Patent No.: US 9,794,798 B2
(45) Date of Patent: Oct. 17, 2017

(54) LEAKY REPEATER ACCESS NODE

(71) Applicants: Michael G. Zierdt, Hillsborough, NJ (US); Simone Maier, Stuttgart (DE); Andreas Pascht, Rudersberg (DE); Dmitry Chizhik, Highland Park, NJ (US)

(72) Inventors: Michael G. Zierdt, Hillsborough, NJ (US); Simone Maier, Stuttgart (DE); Andreas Pascht, Rudersberg (DE); Dmitry Chizhik, Highland Park, NJ (US)

(73) Assignees: Alcatel Lucent, Boulogne-Billancourt (FR); Alcatel-Lucent USA Inc., Murray Hill, NJ (US)

( * ) Notice: Subject to any disclaimer, the term of this patent is extended or adjusted under 35 U.S.C. 154(b) by 312 days.

(21) Appl. No.: 14/584,922

(22) Filed: Dec. 29, 2014

(65) Prior Publication Data
US 2016/0192208 A1    Jun. 30, 2016

(51) Int. Cl.
| | | |
|---|---|---|
| *H04W 16/28* | (2009.01) | |
| *H04B 7/04* | (2017.01) | |
| *H04B 7/155* | (2006.01) | |
| *H04W 72/00* | (2009.01) | |
| *H04W 92/20* | (2009.01) | |
| *H04W 84/04* | (2009.01) | |

(52) U.S. Cl.
CPC ............ *H04W 16/28* (2013.01); *H04B 7/04* (2013.01); *H04B 7/1555* (2013.01); *H04W 72/00* (2013.01); *H04W 92/20* (2013.01); *H04W 84/047* (2013.01)

(58) Field of Classification Search
None
See application file for complete search history.

(56) References Cited

U.S. PATENT DOCUMENTS

| | | | | | |
|---|---|---|---|---|---|
| 5,930,293 | A | * | 7/1999 | Light | H04B 7/084 375/211 |
| 5,946,603 | A | * | 8/1999 | Ibanez-Meier | H04B 7/18513 343/703 |
| 6,032,020 | A | * | 2/2000 | Cook | H04B 7/2606 455/16 |

(Continued)

OTHER PUBLICATIONS

"Frequently Asked Questions (FAQs): 4(e) What is Leaky Feeder?", 4Gon Solutions, Accessed Dec. 29, 2014, 1 page, <http://www.4gon.co.uk/solutions/faq.php#4e>.

(Continued)

*Primary Examiner* — Peter Chau
(74) *Attorney, Agent, or Firm* — Davidson Sheehan LLP (57) ABSTRACT

A leaky repeater access node (LRAN) includes a first directional antenna and a second directional antenna to transmit and receive signals in at least one first frequency band, and a third antenna to transmit and receive signals in a second frequency band. The LRAN also includes first analog components to split a first signal received by the first directional antenna into a first portion and a second portion. The first analog components amplify the first portion and provide the amplified first portion to the second directional antenna. The first analog components also convert the second portion to the second frequency band and provide the converted second portion to the third antenna.

15 Claims, 8 Drawing Sheets

(56) References Cited

U.S. PATENT DOCUMENTS

| | | | | |
|---|---|---|---|---|
| 2009/0323582 A1* | 12/2009 | Proctor, Jr. | ............... | H04B 7/04 370/315 |
| 2010/0284446 A1* | 11/2010 | Mu | .................... | H04B 7/15521 375/211 |
| 2011/0267976 A1* | 11/2011 | Oodachi | ............. | H04W 84/047 370/252 |
| 2013/0149957 A1* | 6/2013 | Desclos | ............. | H04B 7/15535 455/11.1 |
| 2014/0105100 A1* | 4/2014 | Tronc | ................. | H04B 7/18513 370/321 |
| 2015/0200722 A1* | 7/2015 | Kang | ................... | H04B 7/0413 370/315 |
| 2016/0065286 A1* | 3/2016 | Kim | ..................... | H04B 7/0617 370/330 |

OTHER PUBLICATIONS

"MiWEBA—Millimetre-Wave Evolution for Backhaul and Access", MiWEBA, Accessed Nov. 10, 2014, 2 pages, <http://www.miweba.eu/>.

* cited by examiner

LEAKY REPEATER ACCESS NODE

BACKGROUND

Field of the Disclosure

The present disclosure relates generally to wireless communication systems and, more particularly, to access nodes in wireless communication systems.

Description of the Related Art

Wireless communication systems provide wireless connectivity using a network of base stations that provide coverage to large-scale (or macrocellular) coverage areas. The base stations are typically connected to the network using reliable, but costly, high bandwidth wired connections such as fiber-optic cables. However, macrocellular base stations are not the most efficient way to provide coverage to dense urban environments because the complex topology creates significant fading. Macrocellular coverage may therefore be supplemented by other access nodes (which may be referred to as "small cells") that may be mounted on light poles, telephone poles, or the sides of buildings to provide high data rate coverage to outdoor users such as pedestrians walking on the street. Installing wired connections to connect small cells to the network may be very costly. Consequently, the small cells are typically connected to the macrocellular base stations using non-line-of-sight (NLOS) wireless backhaul connections to provide the backhaul connection to a macrocellular base station.

A conventional NLOS wireless backhaul connection includes a set of backhaul connectors that are connected to the small cells. Each small cell is connected to a backhaul connector over a digital interface such as a common public radio interface (CPRI) or Ethernet interface. The backhaul connector forms NLOS wireless backhaul connections with other backhaul connectors (connected to other small cells) or the macrocellular base station. Signals exchanged between the small cell and the backhaul connector must be down-converted to baseband, processed by a high-resolution analog-to-digital converter to generate digital I/Q baseband signals for transmission over the digital interface, and/or further processed by a baseband unit or modem. Signals received by the small cell or the backhaul connector over the digital interface must be processed by a digital-to-analog converter to generate the baseband signal, which is then up-converted to the appropriate radiofrequency for transmission over an air interface by the small cell or the backhaul connector.

SUMMARY OF EMBODIMENTS

The following presents a summary of the disclosed subject matter in order to provide a basic understanding of some aspects of the disclosed subject matter. This summary is not an exhaustive overview of the disclosed subject matter. It is not intended to identify key or critical elements of the disclosed subject matter or to delineate the scope of the disclosed subject matter. Its sole purpose is to present some concepts in a simplified form as a prelude to the more detailed description that is discussed later.

In some embodiments, a leaky repeater access node (LRAN) is provided. The LRAN includes a first directional antenna and a second directional antenna to transmit and receive signals in at least one first frequency band, and a third antenna to transmit and receive signals in a second frequency band. The LRAN also includes first analog components to split a first signal received by the first directional antenna into a first portion and a second portion. The first analog components amplify the first portion and provide the amplified first portion to the second directional antenna. The first analog components also convert the second portion to the second frequency band and provide the converted second portion to the third antenna.

In some embodiments, an apparatus is provided that includes multiple LRANs. The apparatus includes a base station and a plurality of LRANs. Each LRAN includes a first directional antenna and a second directional antenna to transmit and receive signals in at least one first frequency band, and a third antenna to transmit and receive signals in a second frequency band. Each LRAN also includes first analog components to split a first signal received by the first directional antenna into a first portion and a second portion. The first analog components amplify the first portion and provide the amplified first portion to the second directional antenna. The first analog components also convert the second portion to the second frequency band and provide the converted second portion to the third antenna.

In some embodiments, a method is provided for implementation in an LRAN. The method includes receiving a first signal at a first directional antenna in at least one first frequency band, splitting first signal into a first portion and a second portion, and amplifying the first portion and providing the amplified first portion to a second directional antenna. The method also includes converting the second portion to a second frequency band and providing the converted second portion to a third antenna.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

The complexity of transceivers used to implement a wireless backhaul connection between small cells and a macrocellular base station may be reduced by combining wireless backhaul functionality and wireless access functionality in a "leaky" repeater access node (LRAN) to eliminate the digital interface between the wireless access and backhaul functions. As used herein, the term "leaky" indicates that the LRAN extracts or diverts a portion of the backhaul signal from the wireless backhaul connection so that the portion can be provided to one or more user equipment. Thus, each LRAN may function as a separate access node that supports communication with user equipment over different traffic and control channels. A chain of LRANs may communicate with each other (or a macrocellular base station) using wireless connections with high gain (e.g., a line-of-sight (LOS) wireless connection with 36 dB gain) directional antennas to form a wireless backhaul connection to the macrocellular base station. Some embodiments of the LRAN include a first high gain directional antenna to provide a downlink signal received in a first frequency band to radiofrequency components that generate a first analog portion and a second analog portion of the downlink signal. The first analog portion is amplified and provided to a second high gain directional antenna, e.g., for transmission to a downstream LRAN. The second analog portion is converted to a second "access" frequency band and provided to one or more other antennas, e.g., for transmission to user equipment.

For the uplink, the LRAN converts user equipment signals from the access frequency to a third frequency used for the wireless uplink backhaul. The converted signal may be combined with uplink backhaul signals received at the second high gain directional antenna from the downstream LRAN and the combined signals may be provided to the first high gain directional antenna for transmission to an upstream LRAN or base station. The uplink backhaul signal may then travel from LRAN to LRAN until it is received by the macrocellular base station. Some embodiments of the LRAN may allocate sub-bands in the first and third frequency bands for transmitting or receiving uplink and downlink backhaul signals, respectively. Some embodiments of the LRAN may also implement beamforming of signals transmitted or received by the antenna array based on locations of other LRANs or base stations. Furthermore, some embodiments of the LRAN may include dynamic optimization of the high gain beam in order to maintain optimum link conditions under physical movement or swaying of the nodes.

Figure 1:
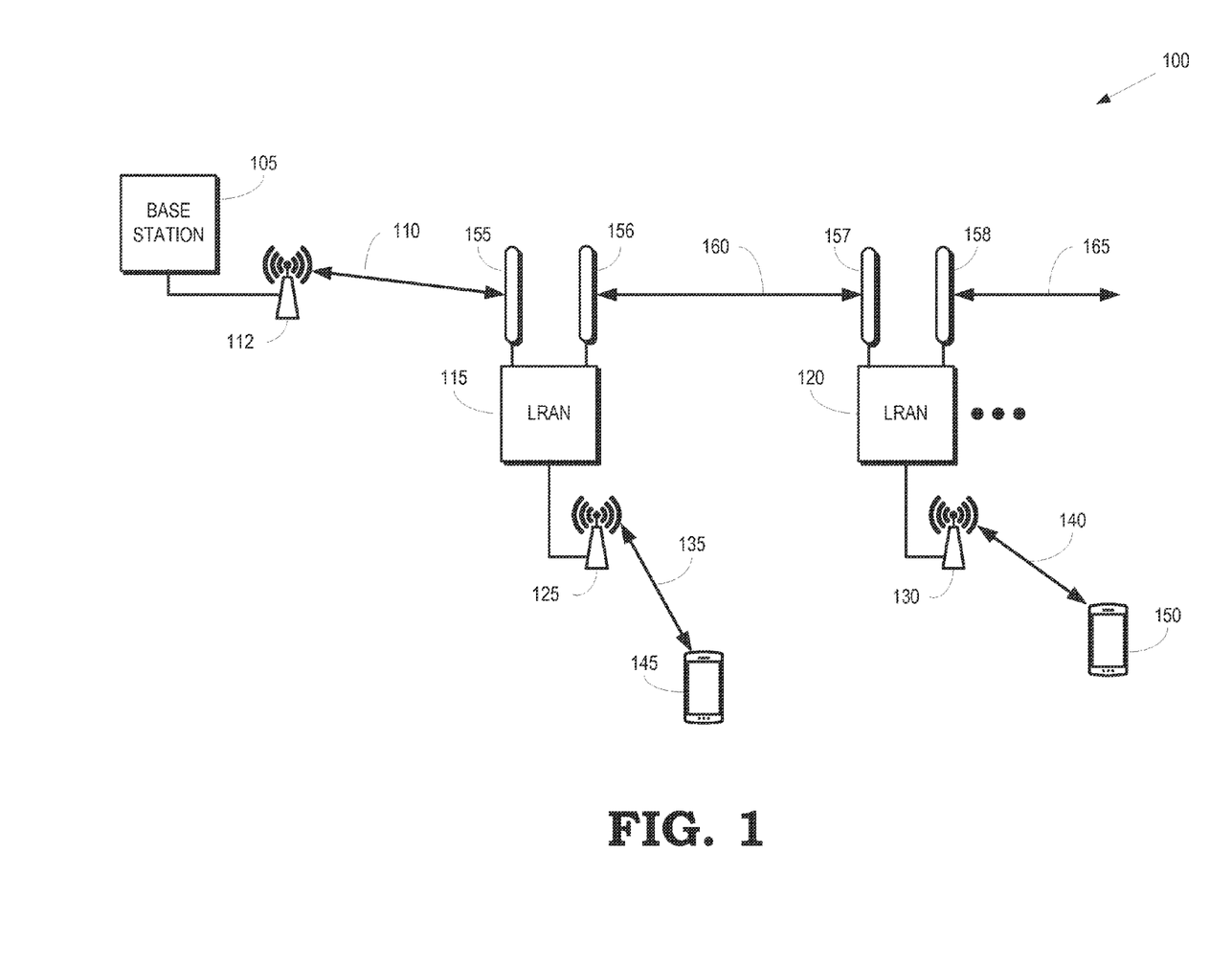
FIG. 1 is a block diagram of a wireless communication system according to some embodiments.

FIG. 1 is a block diagram of a wireless communication system 100 according to some embodiments. The wireless communication system 100 includes a base station 105 that provides wireless connectivity over an air interface 110 using one or more antennas 112. As used herein, the term "antenna" is understood to refer to antenna structures that may include a single antenna, multiple antennas, or an antenna array, as well as additional structures, circuitry, or logic that may be used to implement beamforming or dynamic beam adaptation, as discussed herein. The antenna 112 may therefore be a high gain directional antenna that selectively transmits or receives signals within a beam defined by a direction. The base station 105 may provide uplink or downlink communication over the air interface 110 in one or more frequency bands. Some embodiments of the base station 105 support uplink and downlink communication in a single frequency band such as a frequency band defined by a center frequency of 60 GHz and a bandwidth of approximately 6 GHz. Some embodiments of the base station 105 support uplink and downlink communications in separate frequency bands. For example, the base station 105 may support downlink communications in a frequency band defined by a center frequency of 60 GHz and uplink communication in a frequency band defined by a center frequency of 38 GHz. Uplink and downlink communication may be performed according to one or more standards or protocols such as the Long Term Evolution (LTE) standards defined by the Third Generation Partnership Project (3GPP).

The wireless communication system 100 also includes a plurality of leaky repeater access nodes (LRANs) 115, 120. Each of the LRANs 115, 120 is coupled to antennas 125, 130 that are used to provide wireless connectivity over air interfaces 135, 140 to one or more user equipment 145, 150. Some embodiments of the antennas 125, 130 may be omnidirectional antennas for providing coverage within a corresponding cell or directional antennas for providing coverage within a sector of a cell. The LRANs 115, 120 provide wireless connectivity in an access frequency band that differs from the one or more frequency bands used by the base station 105 for communication over the air interface 110. Some embodiments of the LRANs 115, 120 use an access frequency band at a lower central frequency than the one or more frequency bands used by the base station 105. For example, the LRANs 115, 120 may use an access frequency band defined by a central frequency of 2.6 GHz to provide wireless connectivity to the user equipment 145, 150. However, the relative positions of the frequency bands used by the base station 105 for uplink/downlink communication over the air interface 110 and the access frequency band used by the LRANs 115, 120 may differ in other embodiments.

The LRANs 115, 120 include an upstream antenna 155, 156 and a downstream antenna 157, 158, which may be referred to collectively as "the antennas 155-158." As used herein, the term "upstream" refers to a direction defined by a flow of signals towards the base station 105 and the term "downstream" refers to a direction defined by a flow of signals away from the base station 105. Some embodiments of the antennas 155-158 are high gain (e.g., a gain in a range from 10-50 dB such as 36 dB) directional antennas that selectively transmit or receive signals within a beam defined by a direction. For example, the antenna 155 may selectively transmit or receive signals within a beam defined by a direction from the antenna 155 to the antenna 112. For another example, the antenna 156 may selectively transmit or receive signals within a beam defined by a direction from the antenna 156 to the antenna 157. In some embodiments, the beam directions may be dynamically adapted in response to changes in the relative positions of the antennas 112, 155-158, e.g., in response to physical movement such as swaying of one or more of the antennas 112, 155-158. The antennas 112, 155-158 may perform adaptation of the beam directions without feedback or based on feedback received from other antennas.

The antennas 112, 155-158 may be used to form a wireless backhaul connection between the base station 105 and the LRANs 115, 120 (as well as other LRANs not shown in FIG. 1) over the air interfaces 110, 160, 165. In some embodiments, uplink and downlink wireless backhaul connections are formed in a single frequency band such as a frequency band defined by a center frequency of 60 GHz and a bandwidth of approximately 6 GHz. For example, different portions of the single frequency band may be allocated to the uplink and downlink wireless backhaul connections. In other embodiments, the uplink and downlink wireless backhaul connections are formed in separate frequency bands. For example, downlink portion of the wireless backhaul connection may be formed in a frequency band defined by a center frequency of 60 GHz and the uplink portion of the wireless backhaul connection may be formed in a frequency band defined by a center frequency of 38 GHz. Some embodiments of the base station 105 and the LRANs 115, 120 are deployed in a line-of-sight (LOS) configuration so that there are direct and substantially unobstructed LOS paths between the antennas 112, 155-158. As used herein, the term "substantially unobstructed" is understood to mean that there are no obstructions in the LOS path or, if some obstructions are present, they obstruct a small portion of the LOS path so that any signal degradation caused by the obstruction is below a predetermined tolerance.

The LRANs 115, 120 include analog radiofrequency components that generate a first analog portion and a second analog portion of the downlink signal received by the upstream antennas 155, 157. The first analog portion is amplified and provided to the corresponding downstream antennas 156, 158 for transmission to a downstream LRAN. For example, the LRAN 115 may amplify and transmit the first portion from the downstream antenna 156 over the air interface 160 to the upstream antenna 157 of the LRAN 120. The second analog portion is converted to the access frequency band and provided to the antennas 125, 130 for transmission to user equipment 145, 150. For the uplink wireless backhaul connection, the LRANs 115, 120 may receive signals from the user equipment 145, 150 at the antennas 125, 130. The LRANs 115, 120 may then convert the user equipment signals from the access frequency to the frequency band used for the wireless uplink backhaul. The converted signal may be combined with uplink backhaul signals received at the downstream antennas 156, 158 from a downstream LRAN. The LRANs 115, 120 may then provide the combined signals to a corresponding upstream antenna 155, 157 for transmission to an upstream LRAN or to the base station 105 over the wireless uplink backhaul. Thus, uplink backhaul signals may travel from LRAN to LRAN until the uplink backhaul signals are received by the base station 105.

Figure 2:
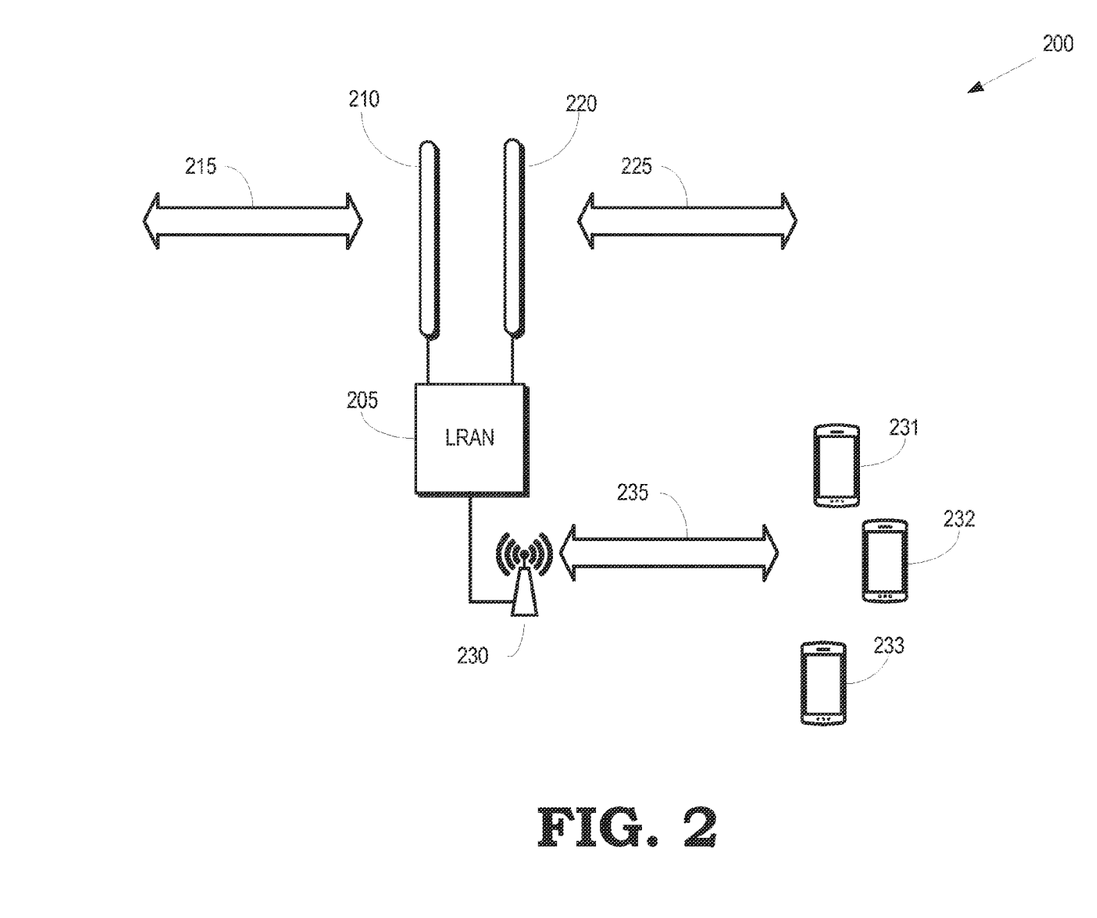
FIG. 2 is a block diagram of a portion of a wireless communication system including a leaky repeater access node (LRAN) that implements uplink and downlink wireless backhaul in a single frequency band according to some embodiments.

FIG. 2 is a block diagram of a portion 200 of a wireless communication system including an LRAN 205 that implements uplink and downlink wireless backhaul in a single frequency band according to some embodiments. The portion 200 of the wireless communication system may be implemented in some embodiments of the wireless communication system 100 shown in FIG. 1. The LRAN 205 includes an upstream high gain directional antenna 210 that provides uplink and downlink wireless backhaul connections to upstream entities (such as another LRAN or a base station) within a frequency band, as indicated by the double-headed arrow 215. The LRAN 205 also includes a downstream high gain directional antenna 220 that provides uplink and downlink wireless backhaul connections to downstream entities (such as another LRAN) within the frequency band, as indicated by the double-headed arrow 225. For example, the frequency band may be a frequency band defined by a center frequency of 60 GHz.

The LRAN 205 also includes an antenna 230 for providing wireless connectivity to one or more user equipment 231, 232, 233 (collectively referred to herein as "the user equipment 231-233") in an access frequency band, as indicated by the double headed arrow 235. For example, the access frequency band may be an access frequency band defined by a center frequency of 2.6 GHz. As discussed herein, the LRAN 205 may split the downlink signals received by the antenna 210 and generate an amplified portion that is provided to the antenna 220 and a frequency-converted portion that is provided to the antenna 230. The LRAN 205 may also combine frequency-converted signals received by the antenna 230 with uplink signals received by the antenna 220 and provide the combined, frequency-converted signals to the antenna 210 for transmission to upstream entities.

Figure 3:
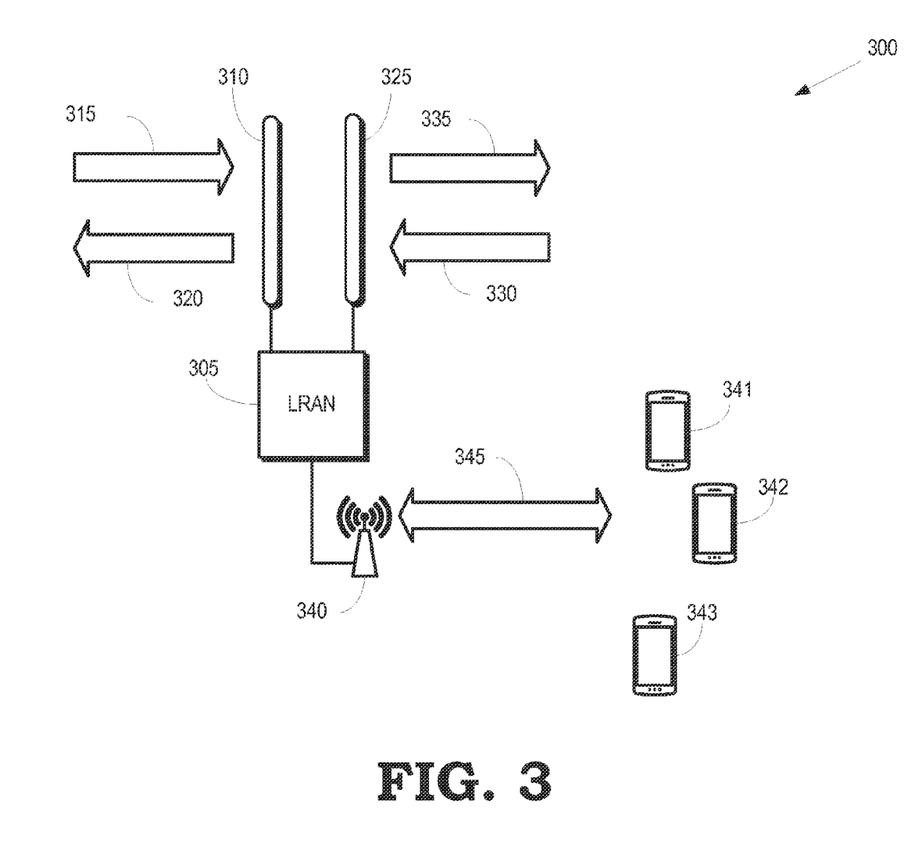
FIG. 3 is a block diagram of a portion of a wireless communication system including an LRAN that implements uplink wireless backhaul in a first frequency band and downlink wireless backhaul in a second frequency band according to some embodiments.

FIG. 3 is a block diagram of a portion 300 of a wireless communication system including an LRAN 305 that implements downlink wireless backhaul in a first frequency band and uplink wireless backhaul in a second frequency band according to some embodiments. The portion 300 of the wireless communication system may be implemented in some embodiments of the wireless communication system 100 shown in FIG. 1. The LRAN 305 includes an upstream high gain directional antenna 310 that receives signals from upstream entities (such as another LRAN or base station) over a downlink wireless backhaul connection within the first frequency band, as indicated by the arrow 315. The upstream high gain directional antenna 310 may also provide signals to the upstream entities over an uplink wireless backhaul connection within the second frequency band, as indicated by the arrow 320.

The LRAN 305 also includes a downstream high gain directional antenna 325 that receives uplink signals from downstream entities (such as another LRAN) over an uplink wireless backhaul connection within the second frequency band, as indicated by the arrow 330. The downstream high gain directional antenna 325 also provides downlink signals over the downlink wireless backhaul connection within the first frequency band, as indicated by the arrow 335. For example, the first frequency band may be a frequency band defined by a center frequency of 60 GHz and the second frequency band may be a frequency band defined by a center frequency of 38 GHz. In some embodiments, the first and second frequency bands may be implemented within the same overall frequency spectrum band, e.g., in different frequency bands within the overall 6 GHz frequency spectrum band at 60 GHz. The first and second frequency bands may therefore be separated by a guard band that is also within the overall frequency spectrum band.

The LRAN 305 also includes an antenna 340 for providing wireless connectivity to one or more user equipment 341, 342, 343 (collectively referred to herein as "the user equipment 341-343") in an access frequency band, as indicated by the double headed arrow 345. For example, the access frequency band may be an access frequency band defined by a center frequency of 2.6 GHz. As discussed herein, the LRAN 305 may split the downlink signals received by the antenna 310 in the first frequency band and generate an amplified portion that is provided to the antenna 325. The LRAN 305 may also convert a portion from the first frequency band to the access frequency band and provide the frequency-converted portion to the antenna 340. Signals received by the antenna 340 may be converted from the access frequency band to the second frequency band and the frequency-converted signals may be combined with uplink signals received by the antenna 325. The LRAN 305 may then provide the combined, frequency-converted signals to the antenna 310 for transmission to upstream entities. In some embodiments, the frequency conversion process may include more than one frequency conversion. For example, a first frequency conversion may be used to mix the frequency of the signal to a higher frequency and then a second frequency conversion may be used to mix the frequency of the signal to a lower frequency so that the net frequency conversion is from the first frequency band to the access frequency band. Performing multiple separate up and down conversions may help mitigate spurious response issues.

Figure 4:
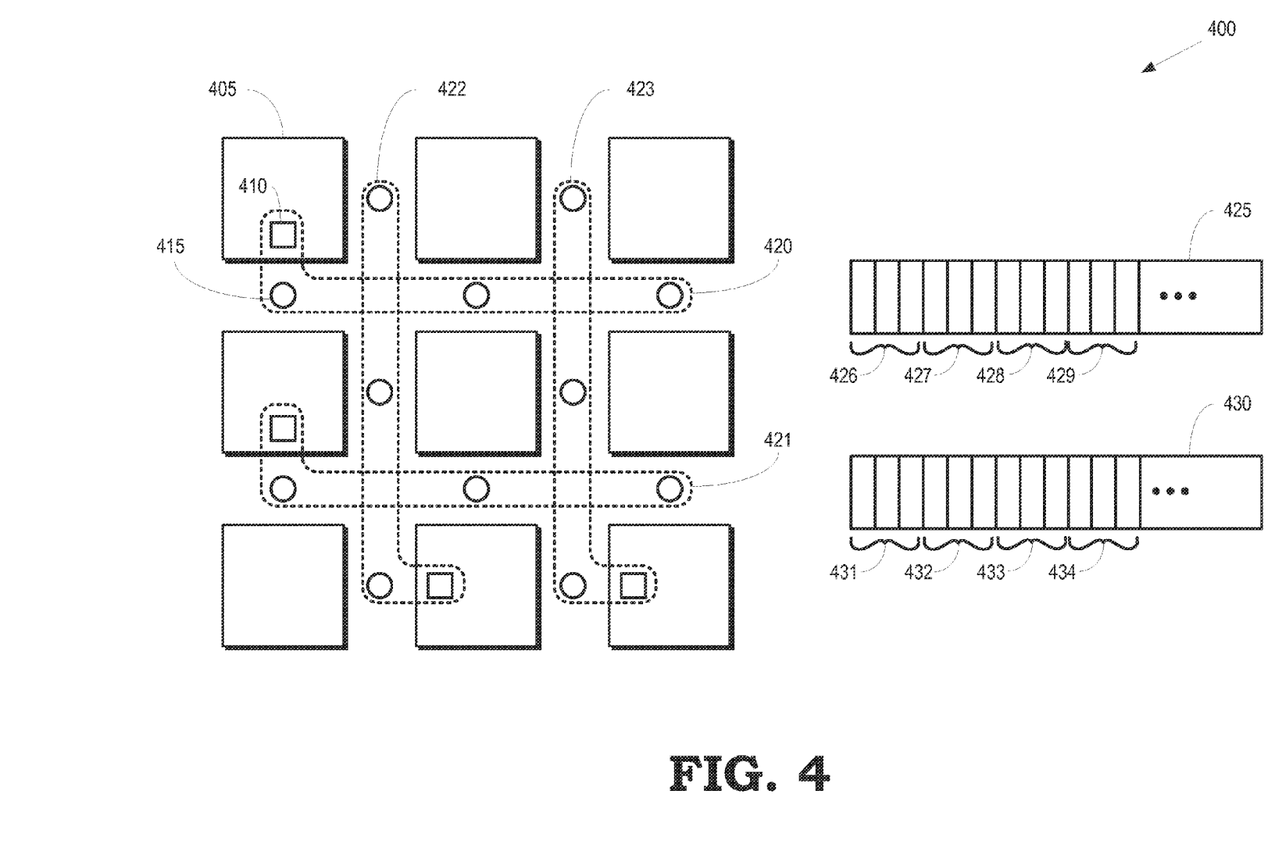
FIG. 4 is an illustration of a deployment scenario in an urban environment according to some embodiments.

FIG. 4 is an illustration of a deployment scenario in an urban environment 400 according to some embodiments. The deployment scenario may use some embodiments of the wireless communication system 100 shown in FIG. 1. The urban environment includes buildings 405 (only one indicated by a reference numeral in the interest of clarity) and intervening space that may include streets, sidewalks, parks, or other outdoor areas. Base stations 410 (represented by small squares, only one indicated by a reference numeral in the interest of clarity) are deployed on one or more of the buildings 405. For example, the base stations 410 may be mounted on poles or brackets at the top (typically near the edge and pointing down) of the buildings 405 or fastened to the sides of the buildings 405. A plurality of LRANs 415 (represented by small circles, only one indicated by a reference numeral in the interest of clarity) are deployed in the intervening spaces between the buildings 405. For example, the LRANs 415 may be attached to light poles, traffic lights, affixed to the sides of the buildings 405 or attached to other structures in or near the intervening spaces.

Each base station 410 may be deployed in a location that permits a substantially unobstructed LOS path to one of the LRANs 415, which may in turn be deployed in a location that permits a substantially unobstructed LOS path to another one of the LRANs 415. Thus, each base station 410 may terminate a wireless backhaul connection that links a chain of one or more of the LRANs 415, as indicated by the dotted lines 420, 421, 422, 423 (collectively referred to herein as "the LRAN chains 420-423"). As discussed herein, the LRANs 415 may implement high gain directional upstream and downstream antennas that selectively transmit and receive signals in beams oriented in directions determined by the other LRANs 415 or the base station 410 in the corresponding LRAN chains 420-423. Orienting the beams along the LOS paths between the LRANs 415 and the base station 410 in each of the LRAN chains 420-423 may increase or optimize the quality of the signals transmitted along the LOS paths and may reduce or minimize interference from signals transmitted along other LRAN chains 420-423 in the urban environment 400.

In some embodiments, the LRANs 415 in each LRAN chain 420-423 are assigned separate sub-bands in an uplink frequency band 425 and a downlink frequency band 430 used to implement the wireless backhaul connection. For example, the LRANs 415 in the LRAN chain 420 may each be allocated one of three (3) sub-bands 426 of the uplink frequency band 425 and one of the three (3) sub-bands 431 of the downlink frequency band 430. The LRANs 415 in the LRAN chain 421 may each be allocated one of three (3) sub-bands 427 of the uplink frequency band 425 and one of the three (3) sub-bands 432 of the downlink frequency band 430. The LRANs 415 in the LRAN chain 422 may each be allocated one of three (3) sub-bands 428 of the uplink frequency band 425 and one of the three (3) sub-bands 433 of the downlink frequency band 430. The LRANs 415 in the LRAN chain 423 may each be allocated one of three (3) sub-bands 429 of the uplink frequency band 425 and one of the three (3) sub-bands 434 of the downlink frequency band 430. The base stations 410 may therefore "address" signals to individual LRANs 415 by transmitting information over the sub-band that is allocated to the LRAN 415. The base stations 410 may also identify the individual LRANs 415 that are transmitting information over the uplink based on the sub-band used to convey the information. Some embodiments may use other techniques to distinguish between signals for transmission to (or reception from) the individual LRANs 415. For example, signals for transmission to (or reception from) the individual LRANs 415 may be distinguished using time division multiplexing, code division multiplexing, orthogonal frequency division multiplexing, and the like.

Figure 5:
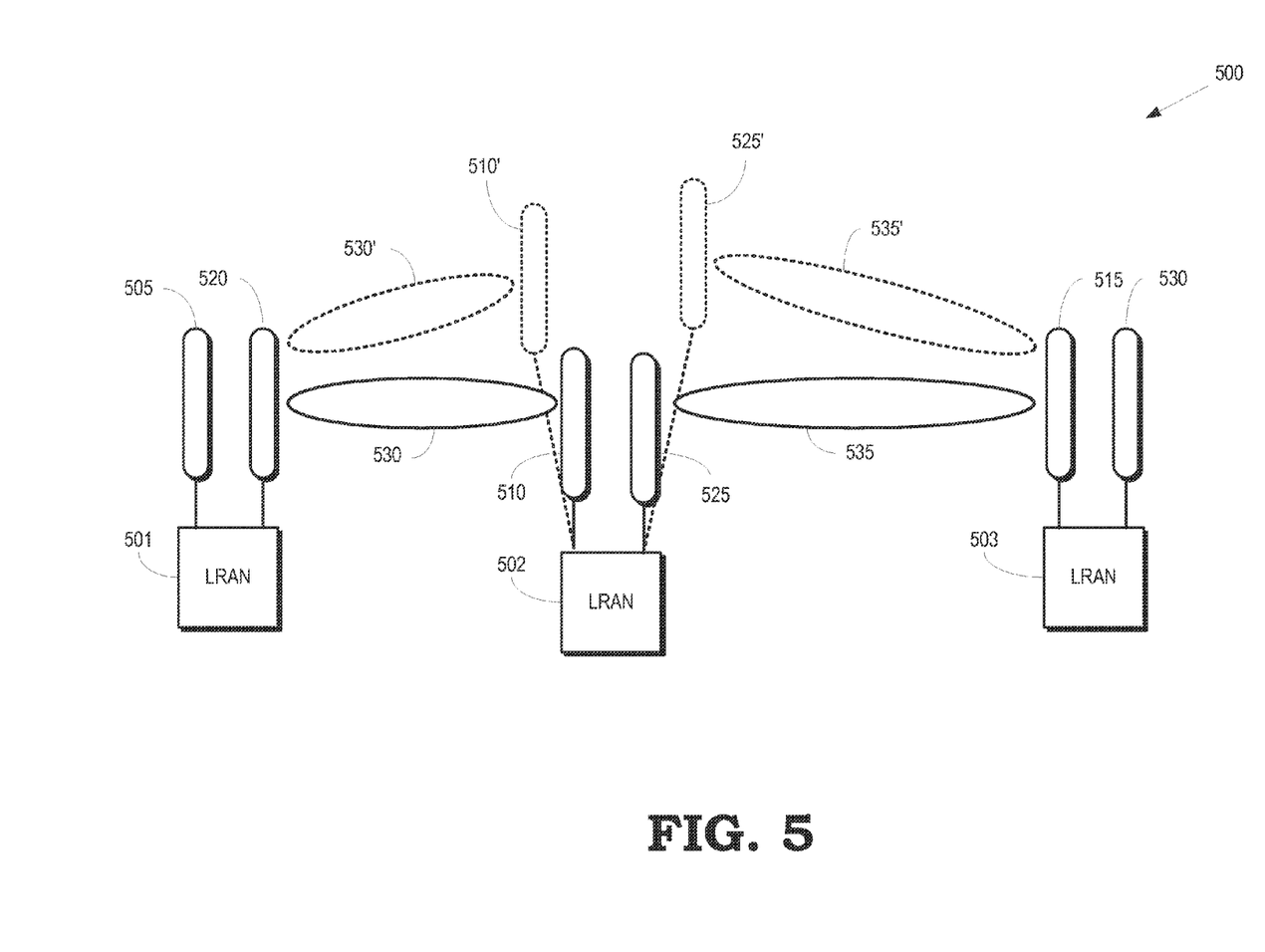
FIG. 5 is a block diagram of a portion of a wireless communication system including LRANs that implement dynamic beam adaptation according to some embodiments.

FIG. 5 is a block diagram of a portion 500 of a wireless communication system including LRANs 501, 502, 503 that implement dynamic beam adaptation according to some embodiments. The portion 500 of the wireless communication system may be implemented in some embodiments of the wireless communication system 100 shown in FIG. 1. The LRANs 501, 502, 503 include upstream high gain directional antennas 505, 510, 515 and downstream high gain directional antennas 520, 525, 530. Some embodiments of the antennas 505, 510, 515, 520, 525, 530 include structures, circuitry, or logic that may be used to implement beamforming or dynamic beam adaptation to selectively transmit or receive signals in a beam defined by a direction. For example, the upstream antenna 510 may selectively transmit or receive signals in a beam 530 that is oriented in a direction defined by the relative positions of the upstream antenna 510 and the downstream antenna 520 at the LRAN 501. For another example, the downstream antenna 525 may selectively transmit or receive signals in a beam 535 that is oriented in a direction defined by the relative positions of the downstream antenna 525 and the upstream antenna 515 at the LRAN 503.

The relative positions or orientations of the antennas 505, 510, 515, 520, 525, 530 may change. For example, wind may cause the position of the upstream antenna 510 to change to a new position 510' and may also cause the position of the downstream antenna 525 to change to a new position 525'. The upstream antenna 510' may therefore use dynamic beam adaptation to change the direction of the beam 530 to a new direction 530' that is defined by the new relative positions of the upstream antenna 510' and the downstream antenna 520. The downstream antenna 525' may use dynamic beam adaptation to change the direction of the beam 535 to a new direction 535' that is defined by the new relative positions of the downstream antenna 525' and the upstream antenna 515. Some embodiments of the antennas 505, 510, 515, 520, 525, 530 may provide feedback (such as channel quality information, reference signal received power, reference signal strength indicators, and the like) to the other antennas 505, 510, 515, 520, 525, 530, which may use the feedback for dynamic beam adaptation or beamforming.

Figure 6:
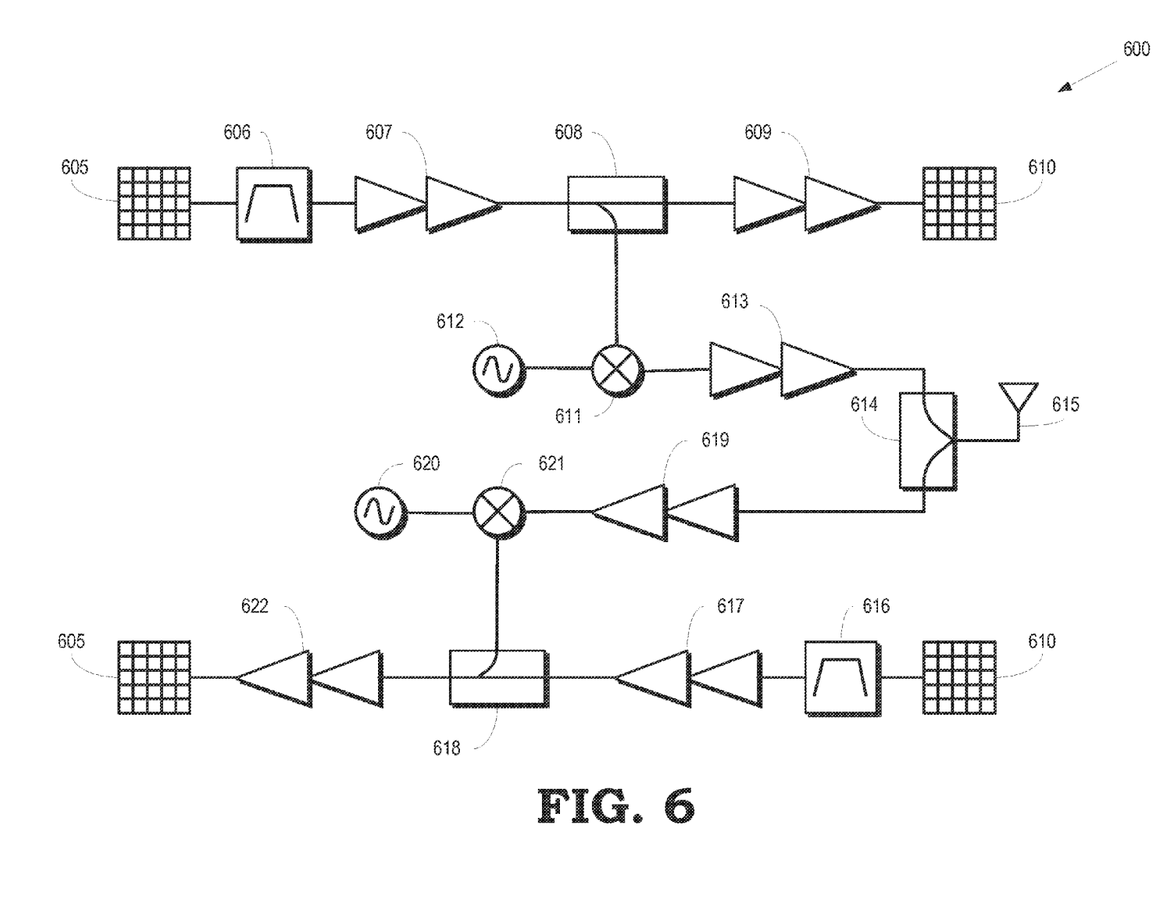
FIG. 6 is a block diagram of an LRAN according to some embodiments.

FIG. 6 is a block diagram of an LRAN 600 according to some embodiments. The LRAN 600 may be used to implement some embodiments of the LRANs 115, 120 shown in FIG. 1, the LRAN 205 shown in FIG. 2, the LRAN 305 shown in FIG. 3, the LRANs 415 shown in FIG. 4, or the LRANs 501-503 shown in FIG. 5. The LRAN 600 includes an upstream directional antenna 605 and a downstream directional antenna 610. As discussed herein, the upstream directional antenna 605 may receive downlink signals in a downlink frequency band of a downlink wireless backhaul and may transmit uplink signals in an uplink frequency band of an uplink wireless backhaul. The downstream directional antenna 610 may receive uplink signals in the uplink frequency band of the uplink wireless backhaul and may transmit downlink signals in the downlink frequency band of the downlink wireless backhaul.

On the downlink, signals received by the upstream directional antenna 605 are provided to an analog filter 606 that may be tuned to remove signals outside of a downlink frequency band used for a downlink wireless backhaul. The filtered analog signal may then be provided to one or more analog amplifiers 607 that may amplify the filtered analog signal and provide the amplified analog signal to a splitter 608. A first portion of the amplified analog signal is provided from the splitter 608 to one or more analog amplifiers 609 to generate an amplify signal that is provided to the downstream directional antenna 610 for transmission, e.g., as part of a downlink wireless backhaul. A second portion of the amplified analog signal is provided from the splitter 608 to a mixer 611 that converts the amplified analog signal to a different frequency. For example, a local oscillator 612 may generate an access frequency and the mixer 611 may convert the amplified analog signal from the downlink frequency band to the access frequency band using signals provided by the local oscillator 612. One or more amplifiers 613 may amplify the frequency-converted signal and provide the amplified signal to a duplexer 614, which may provide the frequency-converted signal to an antenna 615, e.g., for transmission to one or more user equipment.

On the uplink, signals received by the downstream directional antenna 610 are provided to an analog filter 616 that may be tuned to remove signals outside of an uplink frequency band used for the uplink wireless backhaul. The filtered analog signal may then be provided to one or more analog amplifiers 617 that may amplify the filtered analog signal and provide the amplified analog signal to a combiner 618. Signals received in the access frequency band by the antenna 615 may be provided to one or more amplifiers 619 by the duplexer 614. A local oscillator 620 may generate an uplink frequency and a mixer 621 may convert the amplified analog signal from the access frequency band to the uplink frequency band using signals provided by the mixer 620. The combiner 618 may then combine the amplified analog signal received from the amplifiers 617 and the frequency-converted analog signals received from the mixer 621. The combined analog signals may then be provided to one or more amplifiers 622, which may amplify the analog signal and provide the amplified analog signal to the upstream directional antenna 605, e.g., for transmission to an upstream LRAN or base station.

Processing of signals by the LRAN 600 is performed in the analog or radiofrequency domain. The LRAN 600 does not perform analog-to-digital conversion of the received signals to baseband and consequently the LRAN 600 does not need to perform digital-to-analog conversion of a baseband signal back to the uplink or downlink frequency bands. Embodiments of the LRAN 600 may therefore be significantly less complex to implement than conventional backhaul components that require conversion of signals from the analog domain to the digital domain (and back again), as discussed herein.

Figure 7:
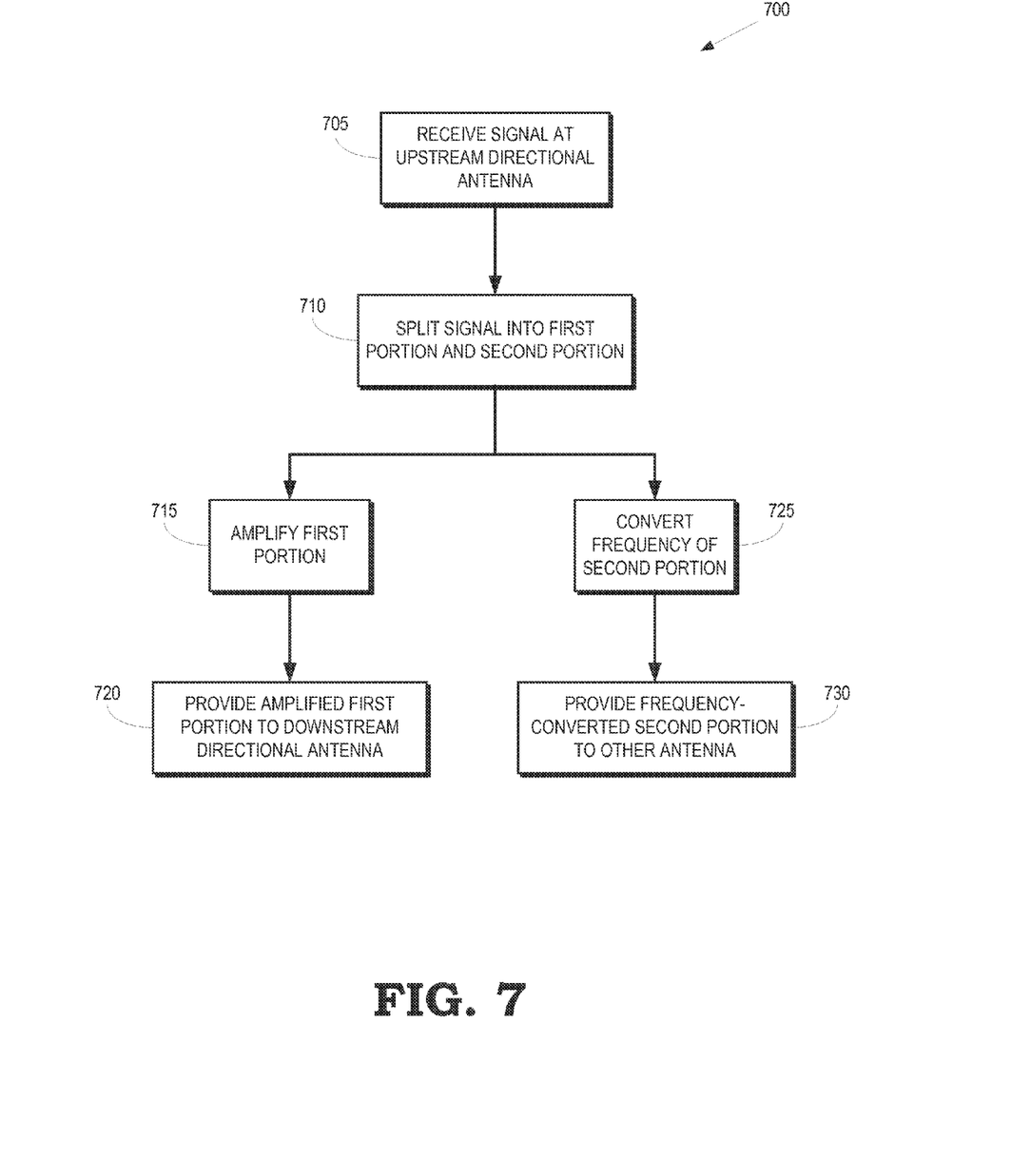
FIG. 7 is a flow diagram of a method of processing signals on a downlink wireless backhaul in an LRAN according to some embodiments.

FIG. 7 is a flow diagram of a method 700 of processing signals on a downlink wireless backhaul in an LRAN according to some embodiments. The method 700 may be implemented in some embodiments of the LRANs 115, 120 shown in FIG. 1, the LRAN 205 shown in FIG. 2, the LRAN 305 shown in FIG. 3, the LRANs 415 shown in FIG. 4, the LRANs 501-503 shown in FIG. 5, or the LRAN 600 shown in FIG. 6. At block 705, the LRAN receives signals in a downlink frequency band of the downlink wireless backhaul at an upstream directional antenna. At block 710, the LRAN splits the received signal into a first portion and a second portion. At block 715, the LRAN amplifies the first portion. At block 720, the amplified first portion is provided to a downstream directional antenna, e.g., for transmission to a downstream LRAN. At block 725, the LRAN converts the frequency of the second portion from the downlink frequency band to an access frequency band. At block 730, the LRAN provides the frequency-converted second portion to another antenna such as an omnidirectional antennae used to provide wireless connectivity to one or more user equipment. As discussed herein, blocks 715, 720 may be performed in the analog domain concurrently with blocks 725, 730.

Figure 8:
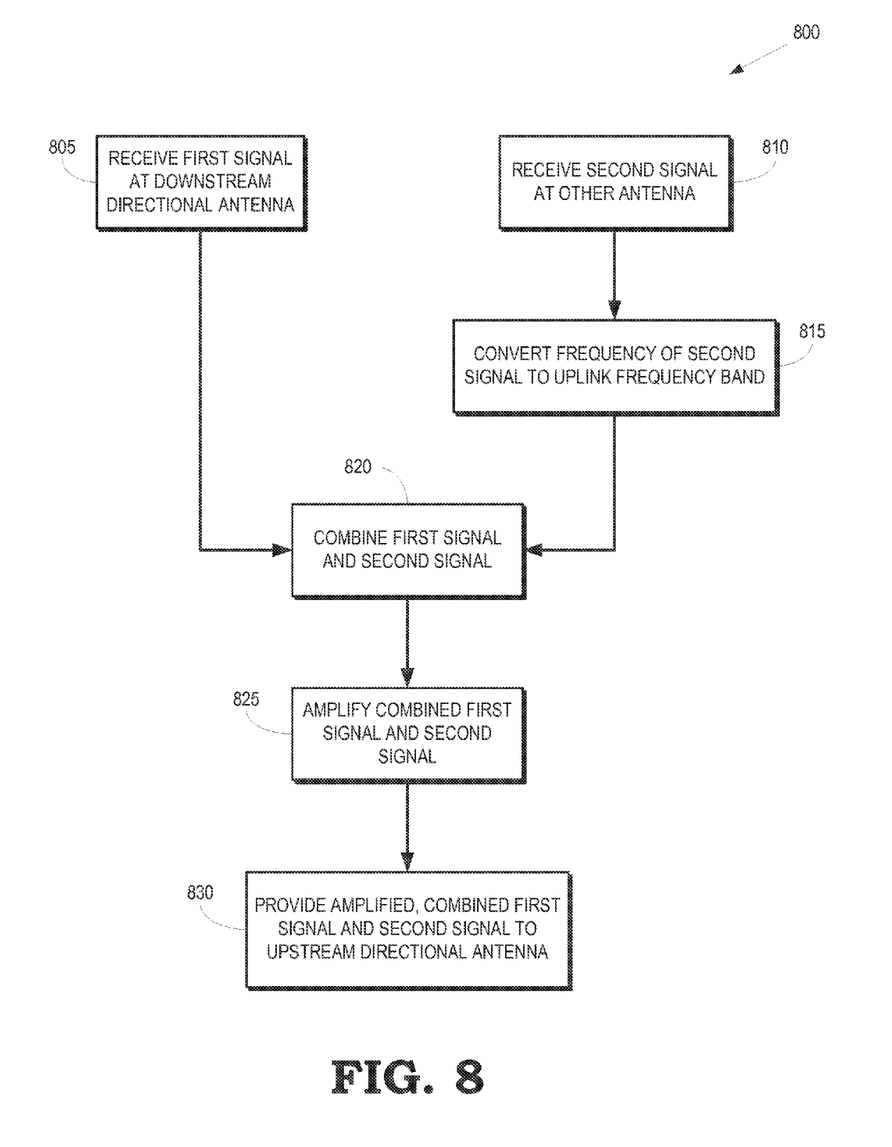
FIG. 8 is a flow diagram of a method of processing signals on an uplink wireless backhaul in an LRAN according to some embodiments.

FIG. 8 is a flow diagram of a method 800 of processing signals on an uplink wireless backhaul in an LRAN according to some embodiments. The method 800 may be implemented in some embodiments of the LRANs 115, 120 shown in FIG. 1, the LRAN 205 shown in FIG. 2, the LRAN 305 shown in FIG. 3, the LRANs 415 shown in FIG. 4, the LRANs 501-503 shown in FIG. 5, or the LRAN 600 shown in FIG. 6. At block 805, the LRAN receives a first signal (e.g., an uplink backhaul signal) at a downstream directional antenna in an uplink frequency band. At block 810, the LRAN receives a second signal (e.g., a communication from one or more user equipment) at another antenna. At block 815, the LRAN converts the frequency of the second signal from an access frequency band to the uplink frequency band. At block 820, the LRAN combines the first signal and the second signal. At block 825, the LRAN amplifies the combined first signal and second signal. At block 830, the LRAN provide the amplified, combined first and second signals to the upstream directional antenna, e.g., for transmission to an upstream LRAN or base station.

Embodiments of the LRANs described herein may have a number of advantages over conventional small cell deployments, particularly in cases where the LRANs are deployed in a LOS configuration. For example, embodiments of the LRANs described herein perform all processing of the received and transmitted signals in the analog or radiofrequency domain. The complexity of the LRAN is therefore significantly reduced relative to conventional small cells that require down-converting the received signals to the digital baseband for transmission over a digital interface to a backhaul connector and then up-converting the digital baseband signals for transmission over the wireless backhaul. For another example, the path loss between base stations and small cells that are deployed in an NLOS configuration is significantly higher than the path loss between base stations and LRANs that are deployed in an LOS configuration, which results in a lower input power to each node in an NLOS configuration. The gain of the repeater functionality in the NLOS small cell must therefore be higher (relative to the gain in a corresponding LRAN deployed in an LOS configuration) to produce the required output power to transmit to the next node. Increasing the gain of the repeater functionality makes the small cells more susceptible to oscillation and makes it more difficult to maintain linearity in the amplifiers, which significantly increases the engineering complexity of the small cell relative to an LRAN. For example, the small cell may down-convert the received signals to baseband and apply analog and digital filtering allows for better gain distribution and signal processing.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A leaky repeater access node (LRAN) comprising:
    a first directional antenna and a second directional antenna, each to transmit and receive signals in at least one first frequency band, wherein the at least one first frequency band comprises an uplink frequency band and a downlink frequency band, wherein the first directional antenna is to receive downlink signals in the downlink frequency band and transmit uplink signals in the uplink frequency band, wherein the second directional antenna is to receive uplink signals in the uplink frequency band and transmit downlink signals in the downlink frequency band, wherein a first sub-band of the uplink frequency band is allocated to the LRAN to transmit and receive uplink signals and a first sub-band of the downlink frequency band is allocated to the LRAN to transmit and receive downlink signals, wherein the first sub-band of the uplink frequency hand is different than at least one second sub-band of the uplink frequency band that is allocated to at least one other LRAN to transmit and receive uplink signals, and wherein the first sub-band of the downlink frequency band is different than at least one second sub-band of the downlink frequency band that is allocated to the at least one other LRAN to transmit and receive downlink signals;
    a third antenna to transmit and receive signals in a second frequency band; and
    first analog circuits to split a first signal received by the first directional antenna into a first portion and a second portion, wherein the first analog circuits amplify the first portion and provide the amplified first portion to the second directional antenna, and the first analog circuits convert the second portion to the second frequency band and provide the converted second portion to the third antenna.

2. The LRAN of claim 1, further comprising:
    second analog circuits to convert a second signal received by the third antenna from the second frequency band to the at least one first frequency band and combine the converted second signal with a third signal received by the second directional antenna to form a combined signal, and the second analog circuits to amplify the combined signal and provide the amplified combined signal to the first directional antenna.

3. The LRAN of claim 1, wherein the first directional antenna is to transmit and receive signals in a first beam oriented to a first direction corresponding to at least one of an upstream LRAN and a base station, and wherein the second directional antenna is to transmit and receive signals in a second beam oriented to a second direction corresponding to a downstream LRAN.

4. The LRAN of claim 3, further comprising:
    beam adjusting circuitry to modify the first direction in response to a change in a relative position of the first directional antenna and at least one of the upstream LRAN and the base station, and wherein the beam adjusting circuitry is to modify the second direction in response to a change in a relative position of the second directional antenna and the downstream LRAN.

5. The LRAN of claim 4, wherein the beam adjusting circuitry is to modify at least one of the first direction and the second direction in response to feedback received from at least one of the upstream LRAN, the base station, and the downstream LRAN.

6. An apparatus comprising:
    a base station; and
    a plurality of leaky repeater access nodes (LRANs), each LRAN comprising:
        a first directional antenna and a second directional antenna to transmit and receive signals in at least one first frequency band, wherein the at least one first frequency band comprises an uplink frequency band and a downlink frequency band, and wherein the first directional antenna in each LRAN is to receive downlink signals in the downlink frequency band and transmit uplink signals in the uplink frequency band, and wherein the second directional antenna in each LRAN is to receive uplink signals in the uplink frequency band and transmit downlink signals in the downlink frequency band, and wherein a different one of a plurality of first sub-bands of the uplink frequency band is allocated to each LRAN to transmit and receive uplink signals and a different one of a plurality of first sub-bands of the downlink frequency band is allocated to each LRAN to transmit and receive downlink signals;
        a third antenna to transmit and receive signals in a second frequency band; and
        first analog circuits to split a first signal received by the first directional antenna into a first portion and a second portion, wherein the first analog circuits amplify the first portion and provide the amplified first portion to the second directional antenna, and the first analog circuits convert the second portion to the second frequency band and provide the converted second portion to the third antenna.

7. The apparatus of claim 6, wherein each LRAN further comprises:
    second analog circuits to convert a second signal received by the third antenna from the second frequency band to the at least one first frequency band and combine the converted second signal with a third signal received by the second directional antenna to form a combined signal, and the second analog circuits to amplify the combined signal and provide the amplified combined signal to the first directional antenna.

8. The apparatus of claim 7, wherein the base station and the plurality of LRANs are deployed in a line-of-sight (LOS) configuration so that each LRAN has a substantially unobstructed LOS to at least one of an upstream LRAN and the base station.

9. The apparatus of claim 8, wherein the first directional antenna in each LRAN is to transmit and receive signals in a first beam oriented to a first direction corresponding to the substantially unobstructed LOS to the upstream LRAN or the base station, and wherein the second directional antennas in the LRANs are configurable to transmit and receive signals in a second beam oriented to a second direction corresponding to a downstream LRAN.

10. The apparatus of claim 9, wherein each LRAN further comprises:
beam adjusting circuitry to modify the first direction in response to a change in a relative position of the first directional antenna and at least one of the upstream LRAN and the base station, and wherein the beam adjusting circuitry is to modify the second direction in response to a change in a relative position of the second directional antenna and the downstream LRAN.

11. The apparatus of claim 10, wherein the beam adjusting circuitry in each LRAN is to modify at least one of the first direction and the second direction in response to feedback received from at least one of the upstream LRAN, the base station, and the downstream LRAN.

12. A method of operating a leaky repeater access node (LRAN), the method comprising:
receiving a first signal at a first directional antenna in at least one first frequency band, wherein the at least one first frequency band comprises an uplink frequency band and a downlink frequency band, wherein the first directional antenna is to receive downlink signals in the downlink frequency band and transmit uplink signals in the uplink frequency band, wherein a second directional antenna is to receive uplink signals in the uplink frequency band and transmit downlink signals in the downlink frequency band, wherein a first sub-band of the uplink frequency band is allocated to the LRAN to transmit and receive uplink signals and a first sub-band of the downlink frequency band is allocated to the LRAN to transmit and receive downlink signals, wherein the first sub-band of the uplink frequency band is different than at least one second sub-band of the uplink frequency band that is allocated to at least one other LRAN to transmit and receive uplink signals, and wherein the first sub-band of the downlink frequency band is different than at least one second sub-band of the downlink frequency band that is allocated to the at least one other LRAN to transmit and receive downlink signals;
splitting first signal into a first portion and a second portion;
amplifying the first portion and providing the amplified first portion to the second directional antenna; and
converting the second portion to a second frequency band and providing the converted second portion to a third antenna.

13. The method of claim 12, further comprising:
converting a second signal received by the third antenna from the second frequency band to the at least one first frequency band;
combining the converted second signal with a third signal received by the second directional antenna to form a combined signal;
amplifying the combined signal; and
providing the amplified combined signal to the first directional antenna.

14. The method of claim 12, further comprising:
at least one of transmitting and receiving signals at the first directional antenna in a first beam oriented to a first direction corresponding to at least one of an upstream LRAN and a base station, and at least one of transmitting and receiving signals at the second directional antenna in a second beam oriented to a second direction corresponding to a downstream LRAN.

15. The method of claim 14, further comprising:
modifying the first direction in response to a change in a relative position of the first directional antenna and at least one of the upstream LRAN and the base station; and
modifying the second direction in response to a change in a relative position of the second directional antenna and the downstream LRAN.

\* \* \* \* \*